(12) United States Patent
Daub et al.

(10) Patent No.: US 6,415,091 B1
(45) Date of Patent: Jul. 2, 2002

(54) GUIDE AND SUPPORT ELEMENT

(75) Inventors: Elmer Daub, Pfinztal; Dieter Bender, Karlsruhe; Paul Mazura; Uwe Rieger, both of Karlsbad, all of (DE)

(73) Assignee: Schroff GmbH, Straubenhardt (DE)

( * ) Notice: Subject to any disclaimer, the term of this patent is extended or adjusted under 35 U.S.C. 154(b) by 0 days.

(21) Appl. No.: 09/454,168

(22) Filed: Dec. 3, 1999

(30) Foreign Application Priority Data

Dec. 4, 1998 (EP) .............................................. 98123117

(51) Int. Cl.⁷ .................................................. G02B 6/00
(52) U.S. Cl. ........................................ 385/135; 385/136
(58) Field of Search .................... 385/76, 86, 134–137, 385/147; 248/68.1, 71, 73; 174/68.3, 72 A, 95, 97

(56) References Cited

U.S. PATENT DOCUMENTS 5,067,678 A  11/1991  Henneberger et al.
5,142,606 A  * 8/1992  Carney et al. .............. 385/134
5,530,787 A  6/1996  Arnett

FOREIGN PATENT DOCUMENTS

| DE | 36 33 209 A | 3/1988 |
| DE | 37 04 560 A | 8/1988 |
| DE | 37 42 448 A | 6/1989 |
| DE | 44 29 514 A | 2/1996 |
| EP | 0 730 177 A | 9/1996 |
| EP | 0 730 178 A | 9/1996 |

\* cited by examiner

Primary Examiner—Cassandra Spyrou
Assistant Examiner—Alessandro V. Amari
(74) Attorney, Agent, or Firm—Merchant & Gould P.C.

(57) ABSTRACT

On a module carrier for digital communications technology modules, a guidance and support element for incoming and outgoing optical wave guides is arranged that is formed of two pieces, an LWL guidance and an LWL support element. An adjustable connector accomplishes the connection of both elements, whereby their position with each other is permitted to change.

9 Claims, 2 Drawing Sheets

GUIDE AND SUPPORT ELEMENT

BACKGROUND

A guide and support element for an optical wave guide is formed with a channel, an open frame, and clamping pins, for the attachment to a module carrier containing digital communications technology modules. These are connected with other modules and distant components by an optical wave guide, whereby the module carrier is designed with a cover plate, which contains a screen of vent holes, two side panels, and at least one supporting rail.

The module carriers or network cabinet modules referred to in the application of the invention, are those which are equipped with electrical, electronic, and opto-electronic components. Transfer systems connect the modules with each other and with their environment, that is to say with other signal sources and/or other signal lowering elements.

The mechanisms operating with optical wave guides require special, additional structural measures, which are to be considered when running the cable of an optical wave guide. For optical wave guides there are small admissible curvature radii, which my not under any circumstances be fallen below. Thus malfunctions and damages of the optical wave guide are avoided.

Optical wave guides that must be led from the front side of a module carrier to its top and from there laterally towards the rear into other areas, require special, adjustable guide and support elements. These serve not only as an edge protection and mounting plate, but above all ensure adherence to the minimum radii when bending the optical wave guide. Attachment elements are on the market, one of which is a plastic injection-molded piece, which indicates both a channel and a frame for inserting the optical wave guide, and clamping pins which can be pressed into vent holes on the cover plate of the module carrier. Here it is unfavorable that module carriers of different designs also necessitate different attachment elements.

The invention is based on the function of conceiving a fastening part that can be arranged on a module carrier possessing guidance and mounting plates for optical wave guides that can pass into or out of modules. This not only permits the deflection of the optical wave guide in a horizontal and vertical direction, in adherence to the admissible minimum radii, and the insertion into mounting plates, but also is functional when the cover plate is at different levels.

For the solution of the proposed task one proceeds with a guide and support element for an optical wave guide which comprises of a channel with an open frame and clamping pins. This can be attached to a module carrier containing modules with digital communications technology, which is also connected with other modules and distant components by an optical wave guide. The module carrier is equipped with at least one supporting rail with a cover plate, indicating a screen of vent holes, two side panels, and at least one supporting rail.

The task is solved by an optical wave guide guide component and an optical wave guide support component, which can be connected together by an adjustable connector. The suggested two-part division of the guide and support element in combination with an adjustable connection between the two sections permits their assembly with one another and allows for different positions.

In a favorable arrangement of the guide and support elements, the optical wave guide guidance component and the optical wave guide support component are arranged in two perpendicular directions against each other and are adjustable. The vertical adjustability allows the arrangement of module carriers with cover plates at different height levels. A horizontal adjustability permits the lateral adjustment in relation to the modules and the balance of tolerances.

It is advantageous that the adjustable connectors consist on the one hand, of a connector tongue at the optical wave guide support component, and on the other hand, of at least two connector receptacles designated on the optical wave guide guide component. Such a connector ensures reliable functioning.

In a preferential arrangement of the guide and support elements, the connector tongue can be designed in front on the optical wave guide support component and the connector receptacles designed at a back wall of the optical wave guide guide components.

A further feature of the invention is that the optical wave guide guide component consists of at least two blind holes on its one long side and on its opposite along side there are at least two connector tangs that align with the blind holes. With the help of these blind holes and the connector tangs the guide and support elements can be lined up next to each other.

By means of an adapter, which can be placed between two neighboring optical wave guide guide components, the distance between a series guides and its support elements that are located in a row can be increased.

The adapter will be favorably equipped with two lateral blind boreholes on its one side and on its opposite side with two laterally designed male plugs. In each case the blind holes correspond to the connector tang of the optical wave guide guide components and in conjunction with these form a connector mounting.

The adapter can indicate a right-angled upward standing designed bracket that can lie transverse to the guide components of shifted optical wave guides.

In accordance with a further feature of the invention, the optical wave guide guide component indicates two resilient claws that face one another at its base. Catch hooks are designed on the claws and are arrangement opposite one other. By means of these claws the optical wave guide guide component can be clamped to a cap rail, which is designed for example at the side panel of the module carrier.

The optical wave guide guide component favorably possesses a holding plate with two resilient holding tabs that face one another. These form a blunt angle together and are arranged towards the body of the optical wave guide guide components. This measure serves to hold the inserted optical wave guide into the channel of the optical wave guide guide component.

The clamping pins of the support component can indicate a socket, with a diameter exceeding that of the ventilation holes. This has the advantage that when the optical wave guide support component is attached to the cover plate, only the holes in which there are clamping pins are plugged. Furthermore this allows the suction of the exhaust air to pass unhindered through the other vent holes which are under the base of the optical wave guide support component.

A mounting plate that can be attached to the side of the module carrier can supplement the subject of the invention. This mounting plate indicates at least two groups of holes each possessing two holes, whereby the distance between two holes correspond to that of the blind holes of the optical wave guide guide component. This mounting plate is used as a termination for a set of guide and support elements and can be screwed on by means of the two groups of holes at two different heights.

On the basis of the attached drawings of the following design example the invention is more nearly described. It shows:

DETAILED DESCRIPTION OF THE PREFERRED EMBODIMENTS

Figure 1:
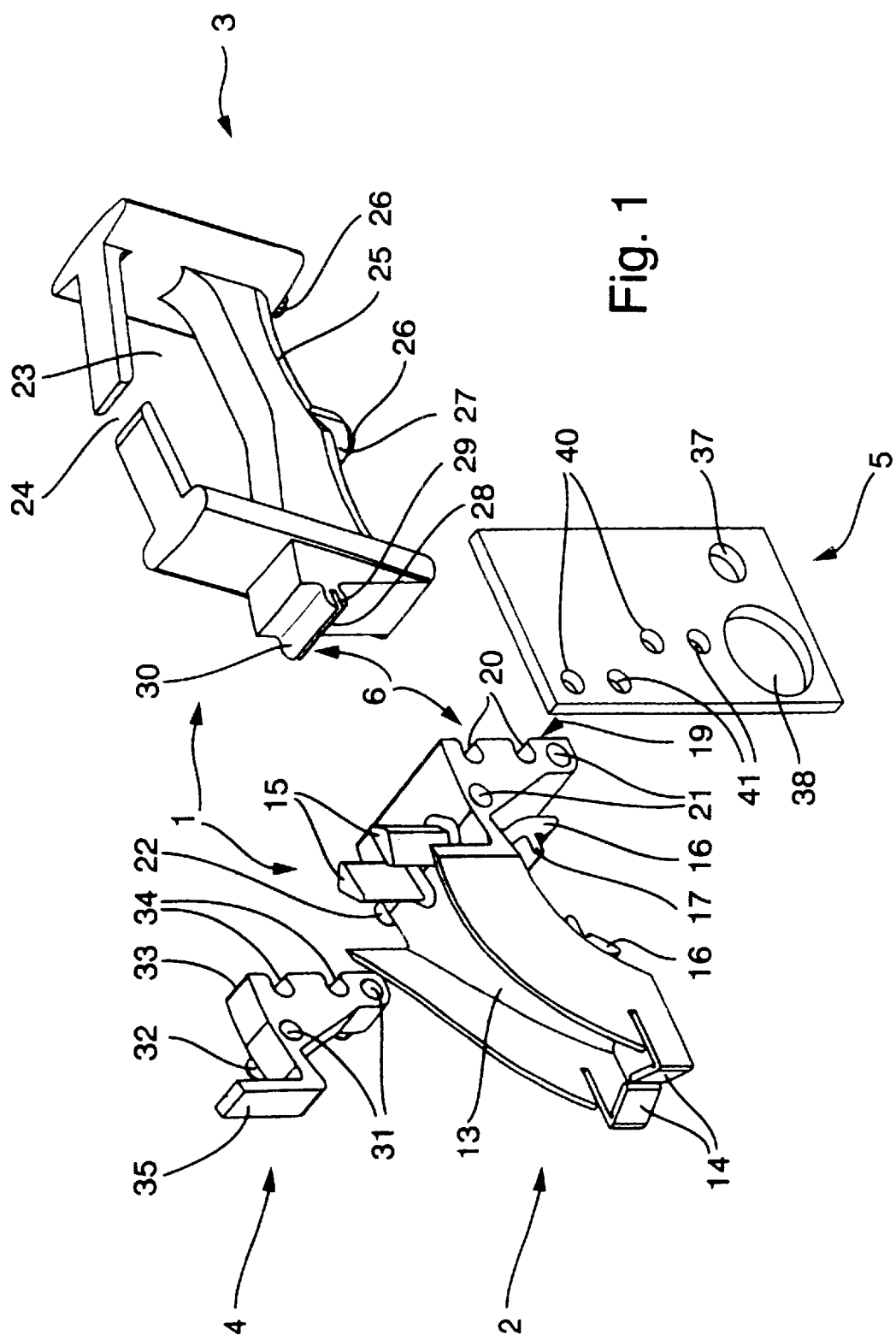
FIG. 1 four sections belonging to the guide and support element are represented in an explosive perspective, FIG. 2 an upper corner of a module carrier with a guide and support element, in perspective.

The guide and support element 1 essentially consists of an optical wave guide guide component 2, an optical wave guide support component 3, an adapter 4, and a mounting plate 5. The optical wave guide guide component 2, the optical wave guide support component 3, and the adapter consist of plastic. The mounting plate 5 is made of aluminum.

The guide component 2 and the optical wave guide support component 3 are connected by an adjustable connector 6. They lie against each other and are adjustable, with regards to their position, in two perpendicular directions.

Figure 2:
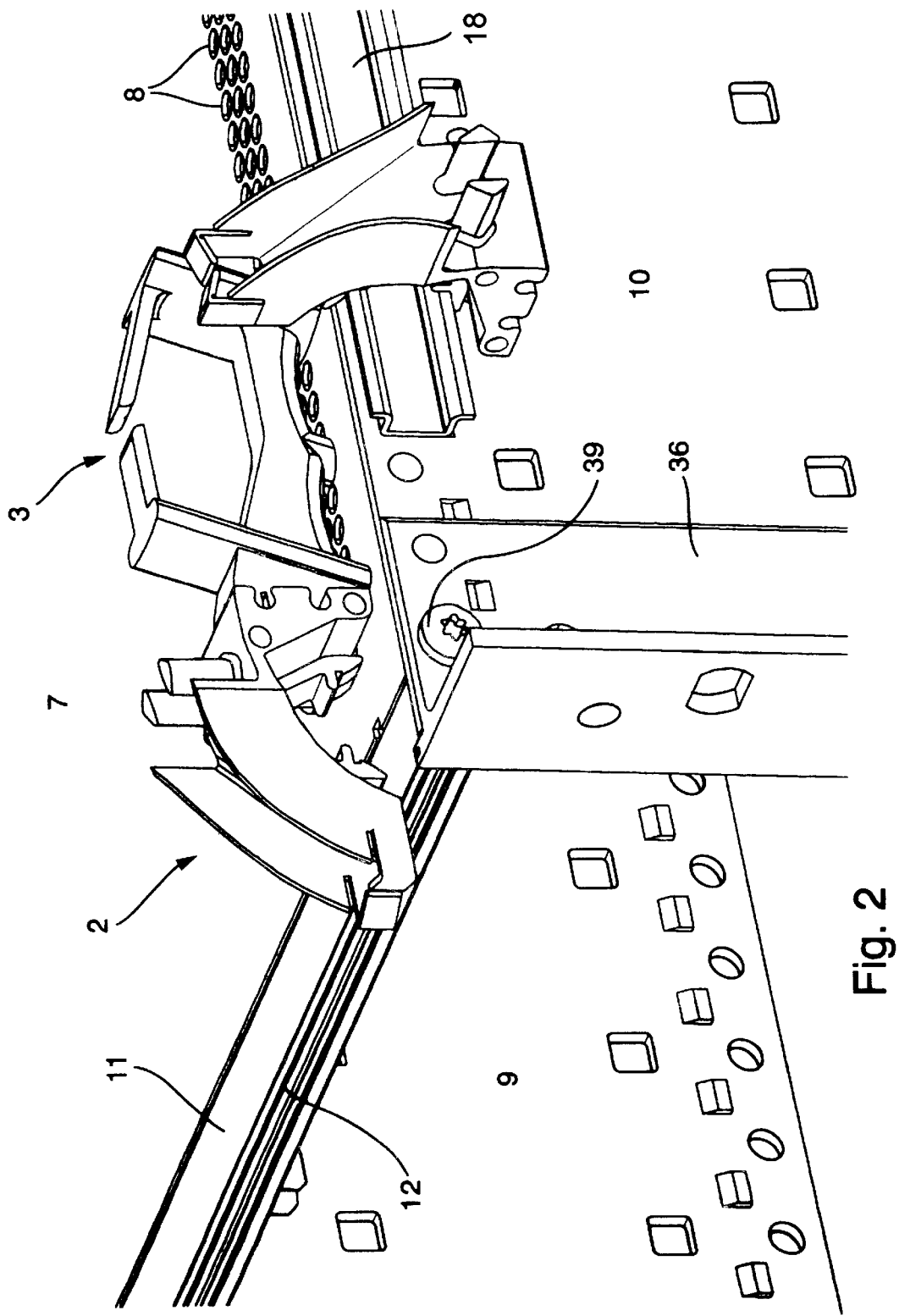

The guide and support element 1 is appropriate for a module carrier, which is designed for the accommodation of modules containing digital communications technology and are connected together with distant components by means of optical wave guides. Such a commercial module carrier possesses (FIG. 2) a cover plate 7, which indicates a screen of circular ventilation holes 8. Two side panels 9 and 10 are connected by several supporting rails, whereby only the front, upper supporting rail 11 is represented.

The optical wave guide guide component 2 lies over the front edge 12 of the supporting rail 9. A channel 13, formed from an approximately one quarter circle elbow, possesses two parallel side panels, at whose lower end two resiliently formed holding tabs 14 which face one another are designed. Together these form a blunt angle and are arranged on the body of the optical wave guide guide component 2.

The two holding tabs 14, together form a holding plate for securing the optical wave guides which are put into the channel 13. In order to prevent their damage, the curvature of the base of channel 13 gives the smallest bending radius of the optical wave guide.

Two guide pins 15 with a triangular profile on their base are designed at the upper end of the channel 13. The optical wave guide is inserted into the channel 13 and can be led in three different directions: in an extension of the channel 13, towards the rear side of the module carrier, and in both directions transverse to the channel, parallel to the supporting rail 11.

Two springy claws 16 that face each other are formed underneath the channel 13 on the lower surface of the optical wave guide guide component 2. These springy claws 16 possess locking hooks 17 that lie across from each other in the area near their ends and serve as for the attachment of the optical wave guide guide components 2 at a cap rail 18, which is designed on the side wall 10 of the module carrier.

The optical wave guide guide component 2 possesses a back wall 19 with a bent profile. The wall 19 has two parallel connector receptacles 20 at different heights, which are pictured facing inward with a cut on the backside and form a section of the connector 6.

The optical wave guide guide component 2 indicates two blind holes 21 beside the connector receptacles 20 on its long side. At the opposite long side two connector tangs 22 are aligned with these blind holes 21.

The optical wave guide support component 3 forms a large, almost rectangular, open frame 23, which serves for inserting and mounting of optical wave guide, and runs parallel to the supporting rail 11. This optical wave guide can be inserted from the top through a slot 24 into this frame 23.

The frame's 23 lower frame arm 25 indicates two clamping pins 26 at its lower surface, on which socket 27 sits. Their diameter exceeds that of the ventilation holes 8. These clamping pins 26 are slit several times in a longitudinal direction, rounded in the front, and equipped with a ring bulb. This allows them to be pressed into two vent holes 8 with the attachment of the optical wave guide support component 3 onto the cover plate 7 and then locked in place by the ring bulb.

The optical wave guide support component 3 possesses a connector tongue 28 at its front frame arm, which forms the second constituent of the adjustable connector 6. The connector tongue 28 is equipped with a longitudinal slot 29 and a bulb 30. The connector tongue 28 is designed in such a way that it is used for the purpose of bringing the optical wave guide guide component 2 together with the optical wave guide support component 3 and is pressed into one of the two connector receptacle's 20 of the optical wave guide guide component 2. Thereby the two constituents (2 and 3) of the guide and support element 1 are connected together and able to release, as recognizable in FIG. 2. The connector tongue 28 can be moved transversally in the connector receptacle 20. This enables the optical wave guide guide component 2 to be shifted for the purpose of the adjustment in a side direction against the optical wave guide support component 3. The connector receptacles 20 arranged one above the other on the optical wave guide guide component 2, permit the adjustment of the guide and support element I in module carriers whose cover plate 7 indicates different heights. This can be due to the fact its cover plate 7 is adjustable to different levels.

The adapter 4 is of a form, which essentially corresponds with the backside of the optical wave guide guide component 2 and is therefore applicable between two neighboring optical wave guide guide components. It is designed with two blind boreholes 31 on its one side and two male plugs 32 on the other side. These correspond with the optical wave guide guide component's 2 blind holes 21 and connector tang 22 thereby forming a connection, with whose assistance the adapter 4 can be connected with the optical wave guide guide component 2 in a releasable manner so that it becomes effective as a spacer. On the back 33 are two female grooves 34, which correspond with the optical wave guide guidance component's 2 connector receptacles 20.

The adapter 4 has a right-angled high standing bracket 35, which is formed to serve as filler for the hole between the optical wave guide guide components 2.

The mounting plate 5 possesses rectangular outline and can be screwed onto the module carrier's mounting flange 36. Screw hole 37 serves this purpose. A round opening 38 thereby takes the head 39 of a screw that serves on the side wall 10 as the attachment of the supporting rail 11. Two groups of holes 40 and 41 in the mounting plate 5 have a distance from each other, which corresponds to that of the blind holes 21 of the optical wave guide guide component 2. On the mounting plate 5 a optical wave guide guide component 2 can be laterally screwed.

What is claimed is:

1. Guide and support apparatus for fibre optic cables adapted for attachment to a rack containing digital communication technology, which are connected by fibre optic cables to other digital communication technology, said rack comprising a cover plate containing a pattern of vent holes and two side panels and at least one supporting rail; the guide and support apparatus comprising:

a guide component comprising a channel in the form of an approximately one quarter circle elbow with an end extending downwards;

a support component having an open frame, two lateral frame arms and at least one clamping pin, said clamping pin being adapted for engaging with said vent holes of said cover plate;

an adjustable connector for releasably connecting said guide component with said support component, wherein said connector comprises a connector tongue and at least one corresponding connector receptacle, and wherein said connector tongue is disposed at an outer side of one of the two said lateral frame arms of said support component, and wherein said connector receptacle is disposed on a back wall of said guide component, so that the frame of said support component extends perpendicularly to said channel of said guide component when said support component is connected to said guide component.

2. Guide and support apparatus according to claim 1, wherein said guide component comprises at least two holes on a first side, and at least two connector tangs on a second side opposite the first side, said connector tangs at said second side aligning with said holes at the first side.

3. Guide and support apparatus according to claim 1, wherein said guide component comprises two springy claws disposed below said channel and facing each other, said claws comprising catch hooks arranged against each other and adapted for attachment at a cap rail of said rack.

4. Guide and support apparatus according to claim 1, wherein said guide component includes a holding plate with two resilient holding tabs forming a blunt angle together, said holding tabs facing the body of said guide component.

5. Guide and support apparatus according to claim 1, wherein said clamping pins of said support component have sockets with a diameter greater than the diameter of said vent holes.

6. Guide and support apparatus according to claim 1, further comprising an adapter insertable between two adjacent guide components.

7. Guide and support apparatus according to claim 6, wherein said adapter has two holes formed therein on a first side of said adapter corresponding to said lateral connector tangs of said guide component, and two laterally molded male plugs on a second opposite side of said adapter corresponding to said holes of said guide component.

8. Guide and support apparatus according to claim 6, wherein said adapter comprises one rectangular high-standing molded bracket.

9. Guide and support apparatus according to claim 2, further comprising a mounting plate adapted for mounting said guide component on a mounting flange of said rack, said mounting plate including at least two groups of mounting holes, each with two mounting holes, wherein said mounting holes correspond to said holes of said guide component.

\* \* \* \* \*